United States Patent [19]
Saponara

[11] 3,754,703
[45] Aug. 28, 1973

[54] CONTROL APPARATUS

[75] Inventor: Domenick Saponara, Chattanooga, Tenn.

[73] Assignee: International Telephone and Telegraph Corporation, New York, N.Y.

[22] Filed: Aug. 2, 1971

[21] Appl. No.: 168,077

[52] U.S. Cl.............. 236/15 A, 236/46 D, 236/75, 317/133.5
[51] Int. Cl............................................. F23n 5/10
[58] Field of Search............. 236/15 A, 21 B, 46 D, 236/75; 317/135.5, DIG. 10

[56] References Cited
UNITED STATES PATENTS

| | | | |
|---|---|---|---|
| 3,281,074 | 10/1966 | Solomon.......................... | 236/46 D |
| 3,571,659 | 3/1971 | Anzai................................ | 317/16 |
| 2,717,123 | 9/1955 | Hilgert et al..................... | 236/75 |
| 2,902,221 | 9/1959 | Hajny............................... | 236/75 X |

Primary Examiner—William E. Wayner
Attorney—C. Cornell Remsen, Jr.

[57] ABSTRACT

A control assembly to operate a gas oven. The main burner receives gas from a solenoid valve energized by a thermoelectric generator through a main thermostat switch. In order to reduce the oven temperature to, e.g. 170° F. to keep the food warm after a timer has run down, the timer and a keep-warm thermostat operate two switches, respectively, to short circuit the solenoid or the thermoelectric generator periodically. The thermoelectric generator output is in the millivolt region. Thus, use of one or two additional, inexpensive, series switches in the circuit can make solenoid operation unreliable because of even moderate contact resistance. Even the use of expensive gold may not avoid the series switch problem. The control assembly disclosed herein avoids this problem by use of a disabling shunt instead of a series switch.

8 Claims, 5 Drawing Figures

Patented Aug. 28, 1973 3,754,703

INVENTOR.
DOMINICK SAPONARA
BY
ATTORNEY

CONTROL APPARATUS

BACKGROUND OF THE INVENTION

This invention relates to electrical devices for energization by the output voltage of a thermoelectric generator including at least a thermopile, and more particularly, to a control assembly to deenergize such a device without opening the circuit between the device and the thermocouple.

Although the device of the present invention will have considerable utility when used in connection with an oven for a gas range in which food is cooked, the invention is not limited to this or any other application described herein. It will, thus, have other useful applications.

In the past, a thermocouple has been connected in series with a main thermostat switch and a gas valve solenoid which admits gas to the main burner of the oven of a gas range. Thus, the thermocouple supplies an exciting voltage for the solenoid in the millivolt region.

It is also old in the art to automatically reduce oven temperature by the use of a timer. Typically, the temperature is reduced to 170° F. to hold the food at serving temperature after it has cooked. However, if attempts are made to do this electrically in a millivolt system by opening the circuit, additional series contacts must be used. The addition of additional series contact resistances can make the system unreliable. The reliability problem can be alleviated to some extent by the use of gold or platinum contacts but this adds expense.

SUMMARY OF THE INVENTION

In accordance with the device of the present invention, the above described and other disadvantages of the prior art are overcome by short circuiting a thermocouple or the load connected thereto. In either case, the load is disabled. However, no disadvantages are attendant upon the short circuiting of the thermoelectric generator or the load.

By short circuiting, no extra pair of contacts are needed in series with the thermoelectric generator. The available E.M.F., therefore, remains high because additional contact resistance is absent. Further, inexpensive shorting contacts may be employed because they need not be gold or platinum.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
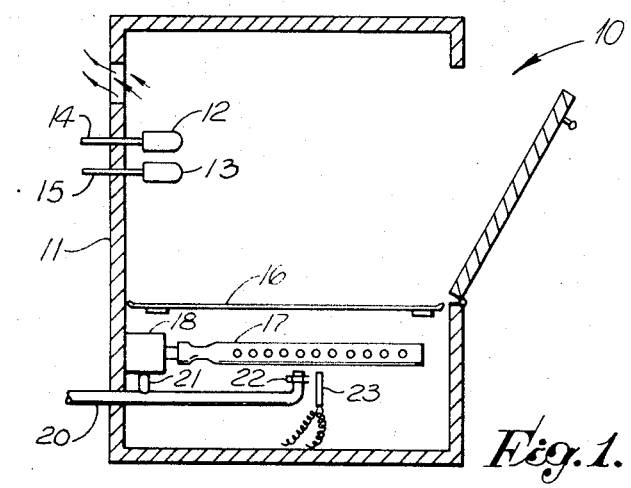
FIG. 1 is a vertical sectional view through a gas oven.

In FIG. 1, an oven is indicated at 10 having a housing 11. A pair of bulbs 12 and 13 are fixed inside housing 11. A pair of tubes 14 and 15 are connected from bulbs 12 and 13, respectively. The interior of tubes 14 and 15 lie in communication with the interiors of bulbs 12 and 13, respectively. Bulbs 12 and 13 are thus hollow. Bulbs 12 and 13 and tubes 14 and 15 are filled with a thermally expansible liquid. The manner in which bulbs 12 and 13 are used will be described hereinafter.

Figure 4:
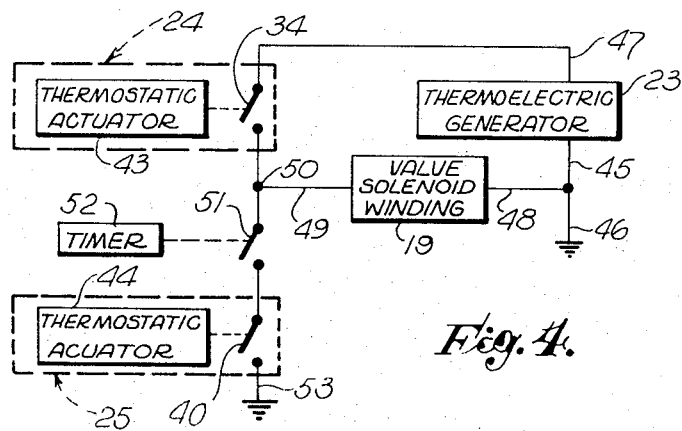
FIG. 4 is a block diagram of one embodiment of the present invention.
Figure 5:
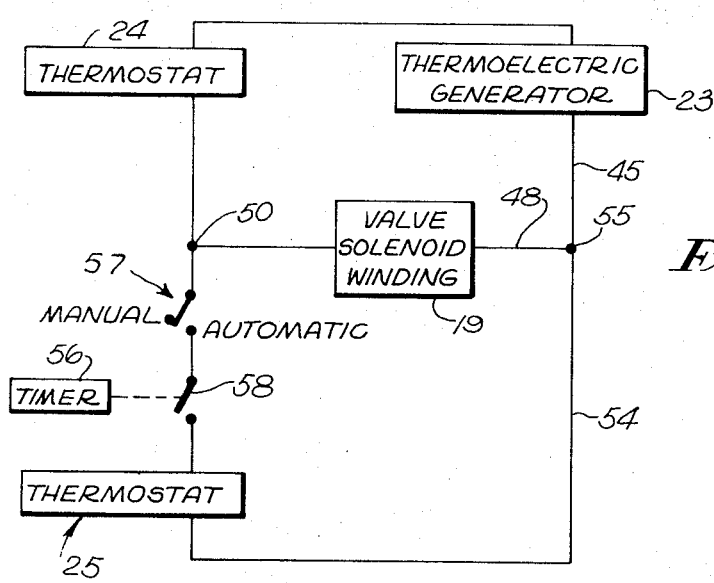
FIG. 5 is a block diagram of another embodiment of the present invention.

A partition 16 is fixed inside oven 10 to housing 11. A main burner 17 is also fixed inside housing 11. A solenoid valve 18 having a winding 19 shown in FIGS. 4 and 5 is connected from a gas input conduit 20 at a pipe T 21. Inlet 20 is also connected to a pilot burner 22. A thermoelectric generator 23 is located adjacent pilot burner 22 to be heated by the heat of combustion generated by gas burning at pilot burner 22.

It is not conventional to employ two bulbs 12 and 13 and two tubes 14 and 15 in FIG. 1. However, all of the apparatus shown in FIG. 1, except the two bulbs 12 and 13, and the two tubes 14 and 15 may be entirely conventional.

Thermostats are shown at 24 and 25 in FIGS. 4 and 5. Thermostat 24 includes bulb 12, tube 14, and all the structure other than tube 14, shown in FIG. 2. Note will be taken that tube 14 is connected to a bellows 26 which operates a lever 27 biased by a spring 28. Lever 27 is fulcrumed on the end of a shaft 29 threaded through a housing 30. The rotatable position of shaft 29 is manually adjustable by a knob 31.

Repeated expansion and contraction of bellows 26 will cause repeated opening of leaf spring contacts 32 and 33 of a switch 34 when the liquid in bulb 12 expands and contracts, respectively.

Figure 2:
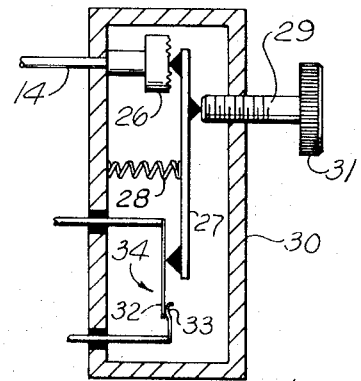
FIG. 2 is a vertical sectional view of a portion of a thermostatic actuator.

Bulb 12, tube 14 and all of the structure shown in FIG. 2 may be entirely conventional. The cooking temperature of the oven 10 may thus be set by turning knob 31 from zero to some baking temperature.

Thermostat 25 operates differently from thermostat 24. Thermostat 25 includes bulb 13, tube 15 and all the structure connected from tube 15, shown in FIG. 3. Thermostat 25 includes a bellows 35, a lever 36 and a spring 37 which may be, if desired, identical to bellows 26, lever 27 and spring 28. A set screw 38 is threaded through housing 39 to set the "keep warm" temperature of the oven.

Figure 3:
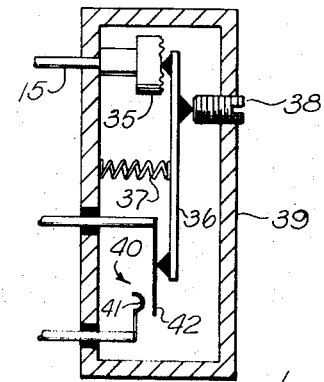
FIG. 3 is a vertical sectional view of a portion of another thermostatic actuator.

The apparatus of FIG. 3 includes a switch 40 having leaf spring contacts 41 and 42 which are engaged when bellows 35 expands. Thus, switch 40 closes when bellows 35 expands, whereas switch 34 opens when bellows 26 expands.

As shown in FIG. 4, all of the structure of thermostat 24 is labeled "thermostatic actuator" at 43, with the exception of switch 34. Similarly, all of the structure of thermostat 25 is labeled "thermostatic actuator" 44, with the exception of switch 40.

Thermoelectric generator 23 has one lead 45 connected to ground at 46, and another lead 47 connected to switch 34.

Winding 19 has one lead 48 connected to ground at 46, and another lead 49 connected to a junction 50. Junction 50 is connected to both switch 34 and to a timer switch 51, timer switch 51 being operated by a timer 52.

The timer switch 51, in turn, is connected to thermostat switch 40, the other side of thermostat switch 40 being grounded at 53.

In the embodiment of FIG. 4, timer 52 is of the type that keeps switch 51 open until it runs down to time ZERO. Switch 51 is then closed. Timer 52 is also of the type which may be located from a ZERO position to an OFF position where switch 51 is open to turn the keep warm control off.

In the operation of the embodiment of FIG. 4, knob 31 is turned to the desired cooking temperature. Actuator 43 then closes switch 34 until the temperature inside housing 11 rises to the temperature set by turning knob 31. When the housing temperature rises above the set temperature, actuator 43 opens switch 34. When the temperature inside housing 11 falls below the set temperature, actuator 43 closes switch 34, and so on. The foregoing is the operation with the timer 52 in the OFF position. Should it be desired to bake at the set temperature for a predetermined time and then to reduce the temperature inside housing 11 to, for example, 170° F., timer 52 is set to the baking time. Switch 51 is thus kept open and baking occurs as previously described until the timer 52 returns to the ZERO position. Switch 51 is then closed. The actuator 44 has previously closed switch 40. The closure of switch 40 short circuits winding 19 through switch 51 to ground. Thermostat 25 thus acts as an override and lowers the temperature inside housing 11 to, for example, 170° F. When the temperature inside housing 11 falls below 170° F., the liquid inside bellows 35 will contract sufficiently to open switch 40 and remove the short circuit across winding 19. Thermostat 25 will thus keep the temperature inside oven 11 at, for example, 170° F. until timer 52 is turned to the OFF position.

As shown in FIG. 5, it is unnecessary to have a ground connection. Winding lead 48 may thus be connected to thermostat 25 by a lead 54, thermoelectric generator lead 45 being connected to both leads 48 and 54 at a junction 55.

Although timer 52 may be entirely conventional, a timer 56 may also be employed of a simpler nature, timer 56 also being conventional. Timer 56 need not have an OFF position spaced from a ZERO position, as described previously, in connection with timer 52. In this case, a single-pole, double-throw switch 57 is connected from junction 50 through a switch 48 operated by timer 56 to thermostat 25. Thus, to shut off the keep warm, switch 57 is opened by switching to the manual position. Timer 56 thus keeps switch 58 open at all times except when it is in the ZERO position. In the ZERO position, timer 56 closes switch 58.

Both of the embodiments shown in FIGS. 4 and 5 are employed to short circuit winding 19. However, this is not necessary. That is, the invention may be practiced also by simply short circuiting thermoelectric generator 23.

Note will be taken that switches 34, 51, 40, 57 and 58 may either be mechanical, solid state or other switches. That is, the same or similar references to "stable states" herein and in the claims is hereby defined to include mechanical and/or electrical stable states.

What is claimed is:

1. An oven comprising: a housing; a pilot burner fixed in said housing; a main burner fixed in said housing adjacent said pilot burner; thermoelectric generator means fixed in said housing in a position adjacent said pilot burner and in a position to be heated by combustion of fuel emanating from said pilot burner, said thermoelectric generator means having first and second leads connected therefrom; a solenoid valve having a fuel inlet, a fuel outlet and electromagnetic winding means, said winding means having first and second leads connected therefrom, said valve outlet being connected to said main burner to supply fuel to said main burner for combustion thereat; a first thermostat including a first thermostatic actuator having at least a first device supported in said housing to produce an output in accordance with the temperature therein, at least a first switch having first and second contacts, said first thermostatic actuator having an arrangement connected from said first device to open said first switch when the temperature of the air inside said housing rises above a predetermined temperature and to close said first switch when the housing temperature falls below said first predetermined temperature, said winding means second lead being connected to said thermoelectric generator means first lead, said thermoelectric generator means second lead being connected to said first switch first contact, said first switch second contact being connected to said winding means first lead; and apparatus including a circuit connected in parallel with one of said thermoelectric generator means and said electromagnetic winding means, said apparatus being actuatable to short circuit such means.

2. The invention as defined in claim 1, wherein said apparatus includes a second thermostat including a second thermostatic actuator having at least a second device supported in said housing to produce an output in accordance with the temperature therein, said second thermostat including at least a second switch having third and fourth contacts, said second actuator having an arrangement connected from said second device to close said second switch when the housing temperature rises above a second predetermined temperature and to open said second switch when the housing temperature falls below said second predetermined temperature, said second switch being connected in shunt with said one means.

3. The invention as defined in claim 2, including a timer having a switch connected in series with said second switch from one lead of said one means to the other lead thereof, said timer switch being open until said timer runs down, whereupon it is closed.

4. The invention as defined in claim 3, wherein said timer is of the type which may be set to a stationary OFF position spaced from its run down or ZERO position, said timer switch being open when said timer is set to said OFF position.

5. The invention as defined in claim 4, wherein said first switch contacts are plated with one of the metals gold and platinum, said second switch contacts being free of gold and platinum, said one means being said winding means, said first predetermined temperature being higher than said second predetermined temperature.

6. The invention as defined in claim 3, including an auxiliary single-pole, double-throw switch connected in series with said second switch from one lead of said one means to the other lead thereof.

7. The invention as defined in claim 6, wherein said first switch contacts are plated with one of the metals gold and platinum, said second switch contacts being free of gold and platinum, said one means being said winding means, said first predetermined temperature being higher than said second predetermined temperature.

8. An oven comprising: a housing; a pilot burner fixed in said housing; a main burner fixed in said housing adjacent said pilot burner; theremoelectric generator means fixed in said housing in a position adjacent said pilot burner and in a position to be heated by combustion of fuel emanating from said pilot burner; a solenoid valve having a fuel inlet, a fuel outlet and electromagnetic winding means, said valve outlet being connected to said main burner to supply fuel thereto for combustion thereat; a first switch having an open position and a closed position connected with both of said means and operable to cause said winding means to be energized by said thermoelectric generator means and to be deenergized; a series circuit connected in parallel with one of said means, said circuit including a series connected second switch operable between open and closed positions, said circuit being adapted to short circuit said one means when said second switch is closed; and temperature sensitive apparatus having connecting portions mounted inside and outside said housing connected to both of said switches for operating the same, said apparatus causing said first switch to change to one of said positions thereof when the temperature in said housing falls below a first predetermined set temperature and to change to the other position thereof when the temperature in said housing rises above said first temperature, said valve supplying fuel to said main burner when said first switch is in said one position thereof, said valve cutting off the supply of fuel to said main burner when said first switch is in the said other position thereof, said apparatus also causing said second switch to move to its closed position when the temperature in said housing rises above a second predetermined set temperature and causing said second switch to move to its open position when the temperature in said housing falls below said second temperature, said circuit also including a third switch connected in series with said second switch, said third switch, when closed, enabling said second switch, when closed, to short circuit said one means, said third switch, when open, preventing said second switch, when closed, from short circuiting said one means, said first temperature being higher than said second temperature, closure of said second switch while said third switch is closed short circuiting said one means and overriding said first switch when said first switch is operated to energize said winding means.

* * * * *